United States Patent Office 3,111,505
Patented Nov. 19, 1963

3,111,505
PROCESS FOR PREPARING POLYMERS AND COPOLYMERS OF VINYL CHLORIDE
Karl Gustav Kurt Rust, Stefan Müllner, and Albert Gustav Martin Gumboldt, Frankfurt am Main, Germany, assignors, by mesne assignments, to Hercules Powder Company, Incorporated, Wilmington, Del., a corporation of Delaware
No Drawing. Filed Mar. 26, 1957, Ser. No. 648,523
Claims priority, application Germany Apr. 4, 1956
7 Claims. (Cl. 260—87.5)

The present invention relates to a process for preparing polymers and copolymers of vinyl chloride.

The known processes for the manufacture of polymers and copolymers of vinyl chloride are carried out in the presence of polymerization catalysts that decompose upon heating to form radicals, which may initiate a chain polymerization of the monomers.

It is also known that lower olefins can be polymerized under low pressure (so-called low pressure process, see Belgian Patents 533,362, 534,792 and 534,888, Ziegler-Polymerization). The catalysts used in these processes are combinations of salts of the elements of sub-groups IV to VI of the Periodic Table with aluminum alkylene or halogenated aluminum alkylene or of reaction products of the aforesaid salts with aluminum alkyl compounds. These combined catalysts may act as polymerization initiators which have not yet been accurately defined; it is assumed, however, that reduction to a lower valency occurs upon adding the metal salts to organo-aluminum compounds. The polymerization activation has also not yet been defined.

The above catalysts could hitherto only be used for the polymerization of lower olefins, for example ethylene, propylene or butene. For the preparation of halogenated vinyl polymers, however, it was necessary to make use of the aforesaid known radical chain polymerization in the presence of oxygen-containing radical forming agents, such as hydrogen peroxide or organic peroxides, for example benzene peroxide, or nitrogen-containing radical forming agents, such as alpha,alpha'-azo-diiso-butyronitrile.

Now we have found that polymers of vinyl chloride and copolymers of vinyl chloride with lower olefins can be obtained by preparing these monomers with the use of a mixture of polymerization initiators obtained from organo-metal compounds and salts of the elements of sub-groups IV to VI of the Periodic Table. This invention refers to the polymerization and copolymerization with Ziegler-catalysts and to feature referred to in the above-mentioned Belgian patents.

It has proved especially advantagesous to use as polymerization initiators mixtures of organo-aluminum compounds, preferably aluminum trialkylene, aluminum alkyl dihalides or aluminum dialkyl halides or mixtures thereof, with titanium or zirconium tetrahalides. In these aluminum compounds, alkyl means always a hydrocarbon radical containing 1–8 carbon atoms.

The catalysts used in the process of this invention initiate the formation of the polymer chain, that is either the vinyl chloride polymerization alone or the copolymerization of vinyl chloride with lower olefins, such as ethylene, propylene or butylene. In carrying out this process 1–99%, preferably 5–90%, of vinyl chloride are incorporated into the copolymer by polymerization. It is also possible to allow the forming or already formed polymer chains to undergo a secondary reaction which leads to the formation of new and interesting high polymers. The reduction of the salts of the elements of sub-groups IV to VI of the Periodic Table may also be brought about with the use of an excess of the aforesaid organo-aluminum compounds, preferably with the use of aluminum trialkyl, in which case the organo-aluminum compound used will split off hydrogen halide from the polymer chain with formation of —C=C— linkages. The aluminum compound in the catalyst system is present in an excess when the proportion of the equivalent amounts of the titanium component to the aluminum compound is greater than 1:1.1. The polymers or copolymers so formed may be cross-linked in three dimensions with the use of known auxiliary vulcanization agents employed in the rubber industry, such as sulfur, tetramethyl-thiurame-disulfide and other organic polysulfides, to obtain caoutchouc elastic to brittle products that are insoluble in organic solvents and yield only swollen masses with the solvents.

A polymerization or copolymerization effected in the absence of a greater excess of organo-aluminum compounds, that is in the case where the aluminum compounds are used in an amount necessary to start and to maintain the polymerization reaction, leads to the formation of polymers which are soluble in the usual solvents for polyvinyl chloride. The same applies to the copolymers obtained by these polymerization reactions provided that a sufficiently high proportion of vinyl chloride has been polymerized into the polymer chain.

The active catalyst used in the process of this invention is obtained by reacting an element of sub-groups IV to VI of the Periodic Table with an organo-aluminum compound. This reaction may be carried out either in the polymerization liquid itself by adding the components together or, alternatively, the previously formed catalyst may be introduced into the reaction mixture to which may also be added additional organo-aluminum compounds for activation (cf. the Belgian patents cited above).

The catalyst concentration may vary within wide limits, i.e. from 5 to 100 millimols, preferably from 10–20 millimols, per liter of polymerization liquid.

The polymerization or copolymerization may be carried out in liquefied vinyl chloride even under the proper vapor pressure of the monomer. It is, however, also possible to operate with solutions of vinyl chloride in inert solvents, such as pentane, hexane, heptane or natural or synthetic hydrocarbons, such as petroleum fractions that are free from oxygen or sulfur or fractions from the Fischer-Tropsch synthesis. The solvents used as dispersing agents may have a boiling point of up to 250° C. According to their rate of conversion into polymers, the monomers may also be introduced into the aforesaid solvents in a gaseous form.

It is already known to prepare copolymers of ethylene and vinyl chloride. These known processes are, however, carried out with application of high pressure contrary to the process of this invention which may be performed under slight pressure even in the case where the copolymer contains a considerable portion of ethylene.

The polymers and copolymers obtained by this invention may serve as raw materials for producing varnishes, and may be shaped as desired. For example, they may be used for the production of films and threads which after having been treated with ammonia or primary, secondary or tertiary amines, or thiourea and the derivatives thereof, have a good affinity for acid dyestuffs. The treatment of the polymers or copolymers of this invention with ammonia or primary amines leads to the formation of cross-linked insoluble compounds.

The following examples serve to illustrate the invention, but they are not intended to limit it thereto.

*Example 1*

A 5 liter autoclave of stainless steel is charged with 3 ml. of titanium tetrachloride and 1.8 liters of freshly distilled vinyl chloride with exclusion of atmospheric oxygen and moisture. Nitrogen is used as protecting gas which is expelled from the autoclave by repeatedly degassing vinyl chloride, and ethylene is forced into the autoclave while stirring until a pressure of 10 atmospheres (gauge) has been reached. A solution of 10 ml. of aluminum triethyl in 500 ml. of vinyl chloride, heated to 10° C. is then introduced in portions under pressure. The temperature in the interior of the autoclave rises to about 35° C. After 2 hours, the vinyl chloride in excess is distilled off; a wax-like polymer is obtained as residue which is extracted to obtain about 25% of a liquid portion, about 8% of a wax-like portion and a highly polymeric portion. The polymers are then freed in the usual manner from the residual catalyst by treating them with dilute acids and lyes. The highly polymeric portion has a viscosity of eta spec/c=0.80 (measured as a solution of 0.5% strength in tetrahydronaphthalene at 130° C.) and a chlorine content of 5%.

*Example 2*

A 5 liter autoclave provided with a stirrer is charged, with exclusion of atmospheric oxygen and moisture, with a solution of 50 millimols of titanium tetrachloride in 50 ml. of a hydrogenated Fischer-Tropsch diesel oil (boiling point: 180–250° C.), and 1000 ml. of liquid vinyl chloride. A solution of 50 millimols of aluminum triethyl in 650 ml. of diesel oil is then added in portions. The temperature is maintained at 50° C. The pressure rises to 7.5 atmospheres (gauge). After 2 hours of reaction, monomeric vinyl chloride is distilled off, the remaining dispersion is stirred with 1000 ml. of isopropanol to destroy the residual catalyst, filtered off with suction and again treated with an aqueous alkaline solution of about 0.5% strength while adding a small amount of emulsifier. The whole is then dried in vacuo; the polymer obtained has a chlorine content of 51.57% (yield: about 120 grams) and can be pressed to obtain films.

*Example 3*

A 5 liter autoclave provided with a stirrer is charged with a solution of 25 millimols of aluminum triethyl in 47 ml. of diesel oil, and 500 ml. of liquid vinyl chloride and a solution of 25 millimols of titanium tetrachloride in 500 ml. of liquid vinyl chloride is then introduced. The reaction time, temperature and work up are as indicated in Example 1. A polymer is obtained with a chlorine content of 50.96%, which is soluble in cyclohexanone to give a clear solution. Yield: about 80 grams.

We claim:
1. A process of preparing a copolymer of 5–90% vinylchloride and a monoolefin of 2–4 carbon atoms which comprises contacting a mixture of said monomers with 5–100 millimols per liter of polymerization mixture of a two-component catalyst system consisting essentially of a halide of a metal of Group IV–B of the Mendelyeev Periodic Table and an alkylaluminum compound selected from the group consisting of an aluminum trialkyl and an alkylaluminum halide, the alkyl radicals of said alkylaluminum compound containing 1–8 carbon atoms.

2. The process of claim 1 wherein said halide is a titanium tetrahalide.

3. The process of claim 1 wherein said catalyst consists essentially of titanium tetrachloride and an aluminum trialkyl, the alkyl radicals of which contain 1–8 carbon atoms.

4. The process of claim 1 wherein said catalyst consists essentially of titanium tetrachloride and an alkylaluminum dichloride, the alkyl radicals of which contain 1–8 carbon atoms.

5. The process of claim 1 wherein said catalyst consists essentially of titanium tetrachloride and a dialkylaluminum monochloride, the alkyl radicals of which contain 1–8 carbons.

6. The process of claim 1 wherein the polymerization is conducted in the presence of a solvent selected from the group consisting of pentane, hexane, heptane, and fractions of natural petroleum with a boiling point of up to 250° C.

7. The process of preparing a copolymer of 5–90% vinylchloride and ethylene which comprises contacting a mixture of said monomers with 5–100 millimols per liter of polymerization mixture of a titanium tetrachloride aluminum triethyl catalyst.

References Cited in the file of this patent

UNITED STATES PATENTS

| | | |
|---|---|---|
| 2,475,520 | Roedel | July 5, 1949 |
| 2,479,367 | Joyce et al. | Aug. 16, 1949 |
| 2,497,291 | Brubaker et al. | Feb. 14, 1950 |
| 2,771,457 | Barnes et al. | Nov. 20, 1956 |
| 2,827,447 | Nowlin et al. | Mar. 18, 1958 |
| 2,832,759 | Nowlin et al. | Apr. 29, 1958 |
| 2,842,474 | Pratt | July 8, 1958 |
| 2,846,426 | Larson et al. | Aug. 5, 1958 |
| 2,867,643 | Hamprecht et al. | Jan. 6, 1959 |

FOREIGN PATENTS

| | | |
|---|---|---|
| 533,362 | Belgium | May 16, 1955 |
| 534,792 | Belgium | Jan. 31, 1955 |
| 534,888 | Belgium | Jan. 31, 1955 |